(12) United States Patent
Knupfer

(10) Patent No.: US 6,530,267 B2
(45) Date of Patent: Mar. 11, 2003

(54) SCANNING SYSTEM HAVING A DEFLECTABLE PROBE TIP

(75) Inventor: Klaus Knupfer, Essingen (DE)

(73) Assignee: Carl-Zeiss-Stiftung, Heidenheim-Brenz (DE)

( * ) Notice: Subject to any disclaimer, the term of this patent is extended or adjusted under 35 U.S.C. 154(b) by 0 days.

(21) Appl. No.: 09/769,255

(22) Filed: Jan. 26, 2001

(65) Prior Publication Data
US 2001/0015097 A1 Aug. 23, 2001

(30) Foreign Application Priority Data
Jan. 28, 2000 (DE) .................... 100 03 693

(51) Int. Cl.$^7$ .................... G01B 5/28; G01B 7/34; G12B 21/28
(52) U.S. Cl. .................... 73/105
(58) Field of Search .................... 73/105; 250/306, 250/307

(56) References Cited

U.S. PATENT DOCUMENTS

| 5,247,751 A |   | 9/1993  | Ohya et al.      |        |
|-------------|---|---------|------------------|--------|
| 5,267,471 A | * | 12/1993 | Abraham et al.   | 73/105 |
| 5,406,832 A | * | 4/1995  | Gamble et al.    | 73/105 |
| 5,483,822 A | * | 1/1996  | Albrecht et al.  | 73/105 |
| 5,489,774 A | * | 2/1996  | Akamine et al.   | 73/105 |
| 5,515,719 A | * | 5/1996  | Lindsay et al.   | 73/105 |
| 5,753,814 A |   | 5/1998  | Han et al.       | 73/105 |
| 5,983,713 A | * | 11/1999 | Matsuzaki        | 73/105 |
| 6,005,246 A | * | 12/1999 | Kitamura et al.  | 73/105 |
| 6,006,593 A | * | 12/1999 | Yamanaka         | 73/105 |
| 6,073,485 A | * | 6/2000  | Kitamura         | 73/105 |
| 6,079,254 A | * | 6/2000  | Chen et al.      | 73/105 |
| 6,189,374 B1| * | 2/2001  | Adderton et al.  | 73/105 |

FOREIGN PATENT DOCUMENTS

| DE | 3050013     | 3/1982 |
| DE | 197 01 701  | 7/1998 |

* cited by examiner

*Primary Examiner*—Daniel S. Larkin
(74) *Attorney, Agent, or Firm*—Walter Ottesen

(57) ABSTRACT

The invention is directed to a scanning system having one or several deflectable probe tips which are excited to oscillation at or near their resonant frequency. A saturation amplifier (16) is provided for detecting and measuring the phase shift between the excitation signal and the oscillation carried out by the probe tip. The saturation amplifier (16) generates a rectangular signal from the incoming sinusoidally-shaped signal (3e) while exactly maintaining the time-dependent position of the zero crossovers of the signal. The detection system, which is required for each probe tip, thereby acquires a very simple configuration of few commercially available components. Saturation amplified rectangular signals exclusively form the basis for the further evaluation. For this reason, a substantial independence of the signal intensity of the oscillation signal is ensured.

10 Claims, 4 Drawing Sheets

SCANNING SYSTEM HAVING A DEFLECTABLE PROBE TIP

FIELD OF THE INVENTION

The invention relates to a scanning system having a deflectable probe tip with actuators which can be excited to oscillate at or near their resonance frequency.

BACKGROUND OF THE INVENTION

Scanning systems of the above kind are utilized in optical near-field microscopes as well as in atomic force microscopes; but also in read-write heads for storage devices. When the probe tip approaches the surface of the object or of the storage device, the excited oscillation of the probe tip is influenced because of the atomic interaction between the probe tip and the object surface or surface of the storage device. This oscillation leads to a damping of the oscillation of the probe tip and to a changed phase shift between the oscillation of the probe tip and of the signal exciting the oscillation. This influencing of the oscillation is used as an index for the distance of the probe tip to the object surface or to the surface of the storage device and for the distance control loop of the probe tip. The measurement of the extent of the influence takes place either via a change of the amplitude of the oscillation or via a change of the phase difference between the excitation signal and the oscillation of the probe tip.

A lock-in amplifier is usually used for the above measuring task. Lock-in amplifiers are, however, relatively complex, large, and expensive. This disadvantage is significant especially for scanning systems having a plurality of parallelly-drivable probe tips as described, for example, in U.S. Pat. No. 5,986,262. This situation is present because a corresponding lock-in amplifier is required for each probe tip.

U.S. Pat. No. 5,753,814 discloses an atomic force microscope (AFM) wherein the detected signal is multiplied by the signal of the oscillator, which serves for exciting the oscillation, and the product signal is lowpass filtered to obtain the phase measurement. In a system of this kind, the amplification of the measurement signal must, however, be adapted to the signal intensity of the particular probe tip because of the required detection sensitivity.

It is known from German patent publication 3,050,013 to utilize a phase detector to determine the contact of an oscillation probe pin with the surface of the object being measured in a coordinate measuring apparatus. The phase detector receives, in parallel, the measurement signal for the oscillation of the probe pin and the output signal of the oscillator exciting the oscillation of the probe pin. Information as to the configuration of the phase detector is, however, not contained in this publication except that the phase detector is intended to generate a summation voltage dependent upon the phase difference.

For a probe head of a coordinate measuring apparatus, it is known from U.S. Pat. No. 5,247,751 to generate rectangular signals via waveform shaping from the essentially sinusoidally-shaped measurement signals for the oscillation of the probe head and to generate, via a flip-flop, a pulse-duty factor corresponding to the phase difference between the detected oscillation and the excitation signal. The phase difference is determined via a logic AND coupling of the flip-flop output to clock pulses and subsequent counting.

SUMMARY OF THE INVENTION

It is an object of the invention to provide a simple evaluation system for a scanning system having probe tips which is substantially independent of the sensitivity, that is, the signal intensity of the oscillation measurement signal. It is also an object of the invention to provide an evaluation system which is suitable for parallelization and is therefore compact and cost effective.

The scanning system of the invention includes: at least one deflectable probe unit; the probe unit including: a deflectable probe tip having a resonance frequency; and, an actuator operatively connected to the probe tip to impart oscillatory movement thereto; an oscillator for supplying an output excitation signal to the actuator for exciting the probe tip to oscillate at or near the resonance frequency; the probe unit further including a sensor detecting the oscillation of the probe tip and outputting a sensor signal indicative of the oscillation; a detection loop for determining the phase difference between the output excitation signal applied to the actuator and the sensor signal; and, the detection loop including a saturation amplifier for receiving and operating on the sensor signal.

The scanning system of the invention includes a deflectable probe tip as known in scanning systems for near-field microscopes or atomic force microscopes. The deflectable probe tip can be excited to an oscillation at or near its resonance frequency. The deflectable probe tips include actuators for exciting the oscillation. Furthermore, and as in known scanning systems, an oscillator is provided whose output signal is supplied to the actuator and, accordingly, functions to excite oscillation of the probe tip. Further, a detection loop is provided which determines the phase difference between the excitation signal (that is, the output signal of the oscillator) and the detected oscillation carried out by the probe tip. According to the invention, this detection loop includes a saturation amplifier. Such a saturation amplifier, as a rule, comprises several amplifiers connected in series. These amplifiers generate a rectangular signal from an incoming signal which is essentially sinusoidal in shape. This rectangular signal is generated while strictly maintaining the position of the zero crossovers of the input signal except for slight constant time-dependent shifts. From the measurement signal for the oscillation of the probe tip, a rectangularly-shaped signal is accordingly generated having zero crossovers which correspond to the time-dependent position of the zero crossovers of the incoming measurement signal. The subsequent signal evaluation takes place based on a saturation-amplified rectangular signal.

In accordance with the invention, a signal amplification takes place until reaching saturation amplification in advance of further signal evaluation and a further amplification beyond the saturation amplification does not change the signal shape. For this reason, a very high overall amplification can be made available. The reliability of the phase detection is thereby substantially independent of the signal intensity of the measurement signal of the oscillation of the probe tip. Accordingly, the detection loop can be used without further measures for probe tips of the various known configurations. The detection loop is thereby universally useable.

The invention is based on the realization that, for a saturation amplifier, the phase position of the input signal is maintained at the output end of the saturation amplifier substantially independently of the input amplitude over an amplitude dynamic range which is greater than $10^5$. This phase position of the input signal is maintained except for a slight essentially constant phase shift caused by the running time of the amplifier.

In an advantageous embodiment of the invention, the detection loop includes an analog multiplier which is connected downstream of the saturation amplifier. The signal of the oscillator is supplied to the analog multiplier as a second input signal. The oscillator signal, which is supplied to the multiplier, is rectangular to start with or a rectangularly-shaped signal is generated in advance of multiplication from a sine-shaped signal via saturation amplification. The output signal of the analog multiplier is then, in turn, a rectangular-shaped signal, which has a zero crossover each time for a zero crossover of one of the two incoming rectangular-shaped signals. This rectangular signal has twice the frequency of the oscillator signal and a pulse-pause ratio proportional to the phase shift between the oscillator signal and the output signal of the saturation amplifier. For the further signal processing, the multiplier needs only to have a lowpass filter connected downstream thereof whereby a measurement signal is directly present for the phase difference between the oscillating measurement signal and the excitation signal.

To preclude multiple meanings of the measurement signal for the phase difference, it is recommended to provide a second multiplier stage likewise having a lowpass filter connected downstream thereof. This second multiplier stage is supplied with the output signal of the oscillator shifted in phase by 90°. Based on the overall resulting two-phase measurement values for the phase difference, the phase position between the oscillation and the excitation signal is unequivocally determined.

Alternately to a second multiplier stage, it is in some cases also possible to adjust a base phase relationship with the aid of phase shifters so that no multiple meanings occur, that is, the phase difference is always between 0 and $\pi$ or between $-\pi$ and 0.

The lowpass filter(s) is/are so configured that the double excitation frequency is sufficiently attenuated, for example, by 80 db. This attenuation is in view to the subsequent further processing, such as the subsequent digitalization. Preferably, the excitation frequency is also attenuated.

The arrangement of limit amplifier and analog multiplier is basically known in radio technology as so-called demodulator chips and can be obtained as a mass-produced product. Here, reference is made to the so-called FMIF-system SA 604A of Philips Semiconductors and the corresponding product specification of Nov. 7, 1997. These or similar components furthermore supply a level signal which is proportional to the logarithm of the input signal over a very large dynamic range of $10^5$.

Because of its simplicity, the system of the invention is especially suitable for parallel scanning systems having a plurality of individually and independently controllable probe tips. For each probe tip, an oscillator having a downstream connected power amplifier as well as one or two demodulator chips with saturation amplifier and analog multiplier and lowpass filter is required. For a digital driving and signal evaluation, the corresponding analog-to-digital converters or digital-to-analog converters can be provided in addition for each probe tip.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
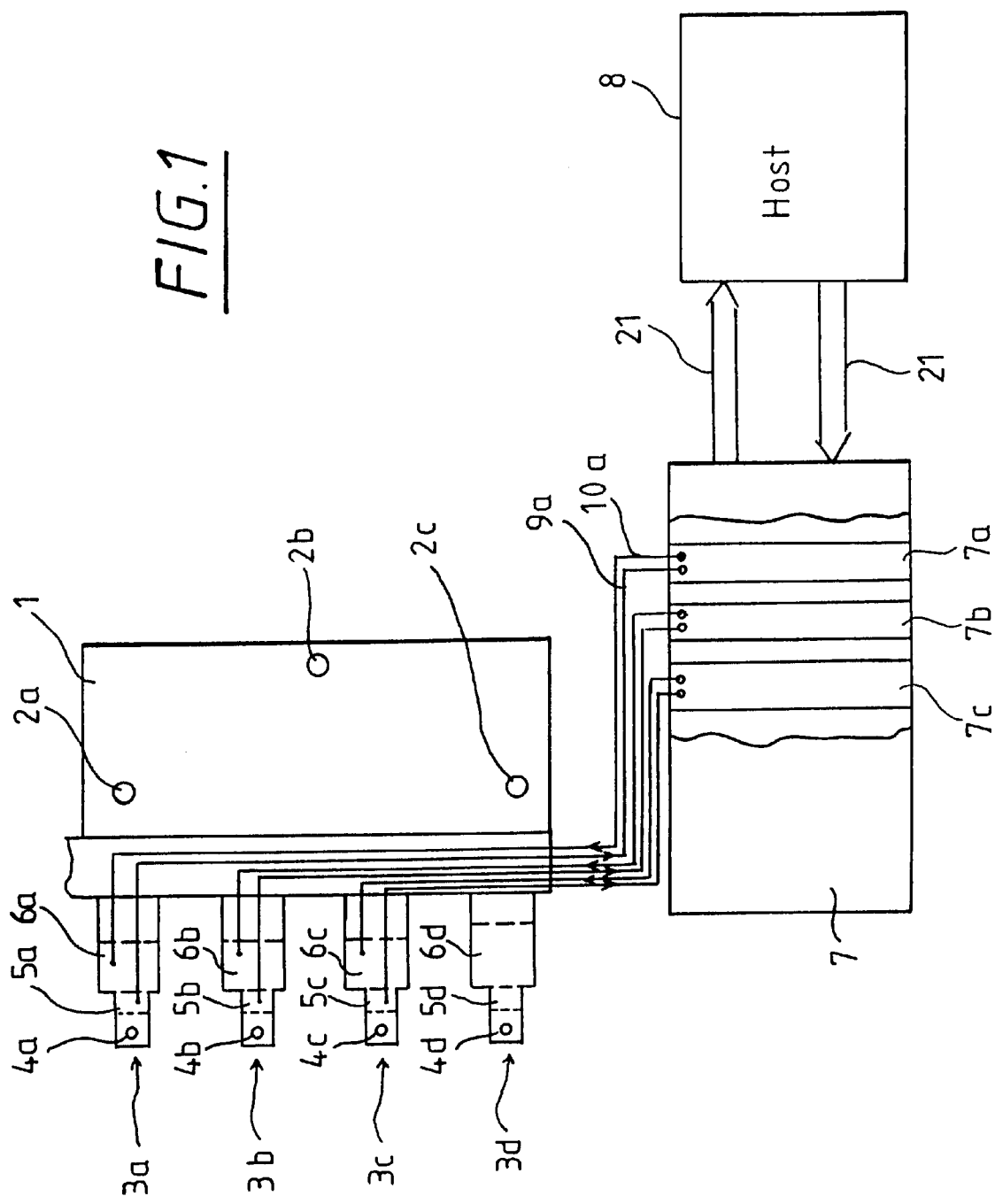
FIG. 1 is a block circuit diagram of the scanning system according to the invention with the scanning system having a plurality of probe tips and a digitalized processing (DSP) unit for the parallel driving and evaluation of the measurement signals of the individual probe tips.

The carrier for the probe system is identified by reference numeral 1 in FIG. 1. This carrier can be shifted in three spatial directions in the micrometer range by a host 8 via three micrometer adjusting units (2a, 2b, 2c). This adjusting possibility serves for a coarse adjustment of the carrier 1 with the probe tips (4a, 4b, 4c, 4d), which are accommodated in the carrier, relative to the surface to be measured or to the data carrier to be written into. A plurality of lamella-like probe systems (3a, 3b, 3c, 3d) are accommodated on the base body 1 and, for the sake of clarity, only four of these probe systems are shown in FIG. 1. Usually, sixteen or more probe tips can be accommodated on the base body 1. The probe tips are arranged in parallel or as a two-dimensional array.

The individual scanning systems themselves can be produced with the methods conventional in microstructure technology and be built up on a substrate of silicon with the usual techniques of the microstructure technology. Each of the lamella-shaped scanning systems carries the actual probe tip (4a, 4b, 4c, 4d) on its peripheral end. Each individual lamella furthermore includes a region with a piezoelectric coating (6a, 6b, 6c, 6d) which serves as actuators for the individually adjustable bending of the lamellas. The actuators (6a, 6b, 6c, 6d) serve for adjusting the spacing of the particular probe tip (4a, 4b, 4c, 4d) and the object to be measured or the surface of the storage medium, which is to be written into, as well as for exciting the probe tips to oscillation. A further piezostrictive region (5a, 5b, 5c, 5d) is located between the respective actuator regions (6a, 6b, 6c, 6d) and the particular probe tips (4a, 4b, 4c, 4d). This piezostrictive region is electrically insulated from the respective actuator regions (6a, 6b, 6c, 6d) and serves as a sensor region. The oscillation movements executed by each individual lamella are detected by these sensor regions and conducted via corresponding contact leads to signal evaluation.

In view of the above, each probe system is connected via two signal lines to an insert card (7a, 7b, 7c) of a DSP unit 7 with the insert cards being assigned to corresponding ones of the probe systems. Each output 10a of the insert card 7a is connected to the actuator region 6a of the corresponding lamella 3a of the probe system and an input 9a of the insert card 7a is connected to the sensor region 5a of the corresponding lamella 3a of the probe system. The DSP unit 7 and the insert cards (7a, 7b, 7c), which are accommodated in the DSP unit 7, are themselves, in turn, controlled by the host computer 8 via a DSP bus 21.

Figure 2:
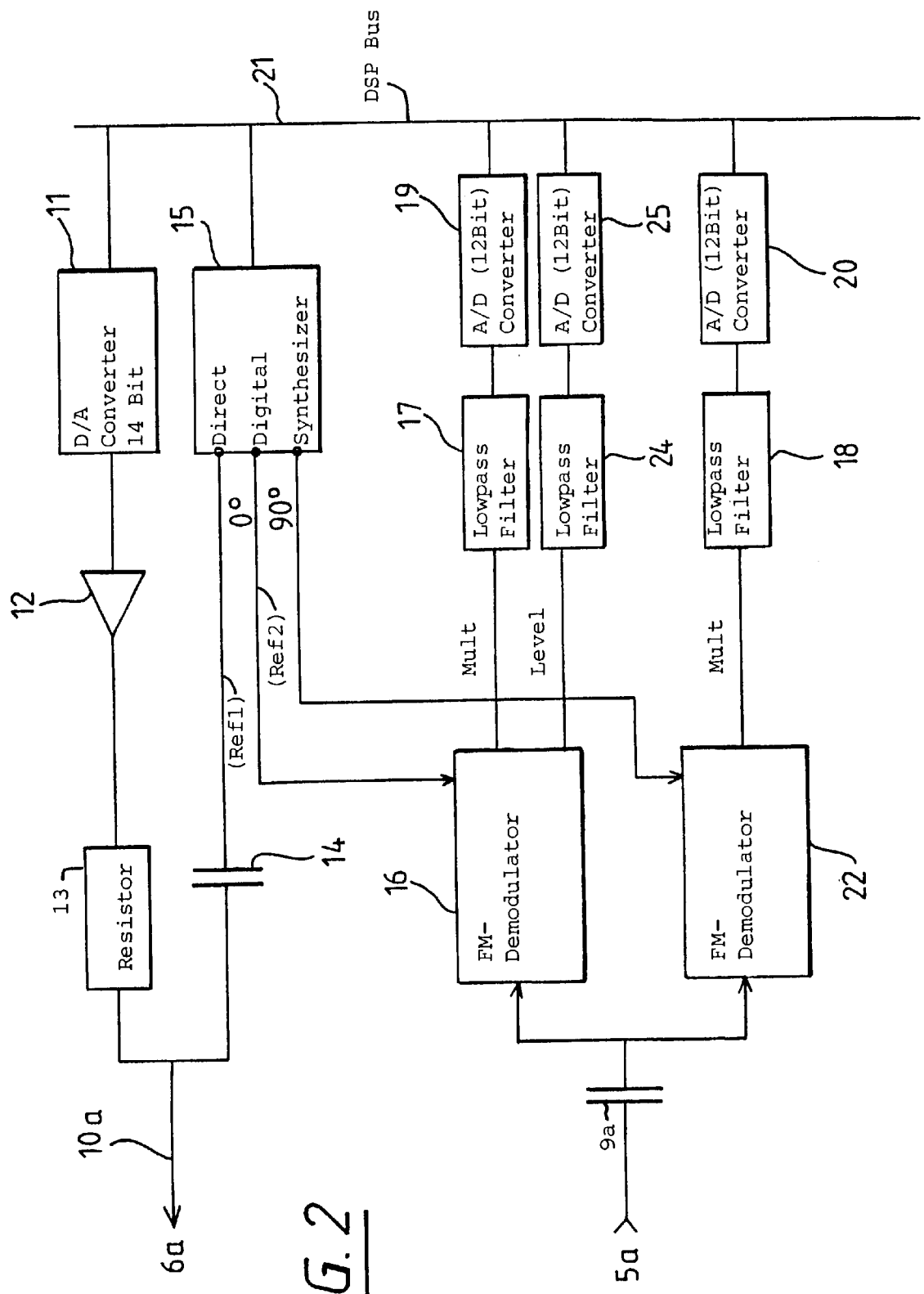
FIG. 2 is a block circuit diagram for the insert card provided for each probe tip in the DSP unit.

The components which are provided for each of the insert cards (7a, 7b, 7c) for corresponding ones of the probe systems are shown in FIG. 2. The DSP bus 21 is likewise shown in FIG. 2. This bus serves to conduct signals away from and to the host 8. A low-frequency loop having a 14 bit digital-to-analog converter 11 and an operational amplifier 12 and a resistor 13 is provided for the individual distance adjustments. The operational amplifier 12 is connected downstream of the digital-to-analog converter 11. A digitally adjustable oscillator 15 having an output frequency between 0 Hz and 1 MHz is provided parallel to this low-frequency loop. The frequency is adjustable in steps of 1 mHz. An adjustability in substantially larger steps of several Hz would, however, also be fully adequate for the present invention. A capacitor 14 is provided in the output loop of the oscillator 15 for decoupling the high-frequency excitation and the low-frequency lamella deflection for adjusting distance. The low-frequency signal and the high-frequency excitation signal are superposed upon each other and supplied to the actuator region 6a of the lamella via the output 10a.

Furthermore, the insert card includes a first FM-demodulator chip 16 and a second FM-demodulator chip 22 with each chip including a limiting amplifier and a downstream multiplier stage. The FM-demodulators (16, 22) each receive, as an input signal, the oscillation signal which is measured by the sensor region 5a.

Figure 3:
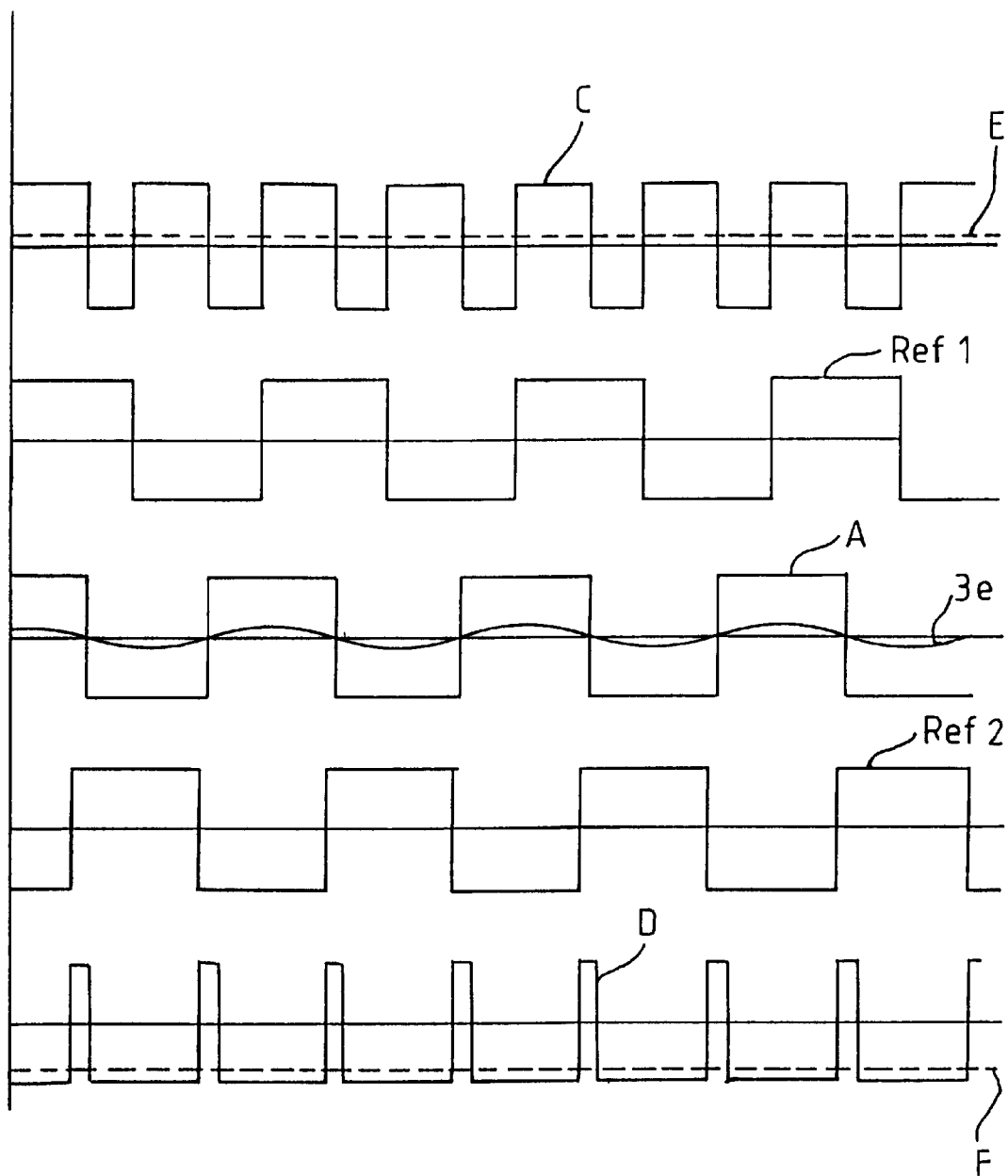
FIG. 3 shows the input and output signals in an evaluation loop in accordance with the invention; and, FIG. 4 is a block circuit diagram of the insert card of an alternate embodiment provided for each probe tip in the DSP unit.

The principle of the limiting amplification and the signal preparation is now explained with respect to the waveforms of FIG. 3. The middle curve 3e in FIG. 3 shows, for example, the oscillation signal generated in the sensor region 5a. A rectangularly-shaped signal A is generated in the FM-demodulator 16 by the limiting amplification. The zero crossovers of the signal A, with respect to time, correspond exactly to the position of the zero crossovers of the measurement signal 3e except for a small constant time-dependent shift which is caused by the running time of the signal through the limiting amplifier. The second highest curve provides the time-dependent trace of the oscillator signal Ref1 and the second lowest curve shows the time-dependent trace of the oscillator signal Ref2 shifted in phase by 90°. The output signal Ref1 of the oscillator 15 is supplied to the first demodulator chip 16 via the second input and the oscillator signal Ref2, which is phase shifted by 90°, is supplied to the second demodulator 22. Each of the two FM-demodulators (16, 22) forms the product of the saturation amplified input signal A and the respective oscillator signal (Ref1, Ref2) supplied thereto.

The time-dependent trace of the output signal of the first FM-demodulator 16 is presented in the upper curve C and the time-dependent trace of the output signal of the second FM-demodulator 22 is shown as the lowest curve D. Both output signals of the FM-demodulators (16, 22) are, in turn, rectangular and have twice the frequency of the input signal (3e, A). The pulse duty factors (pulse-pause ratios) are dependent upon the phase shift between the input signal (3e, A) and the particular reference signal (Ref1, Ref2). The two output signals (C, D), which are generated in this manner, are filtered by two parallel lowpass filters (17, 18) and, thereafter, the lowpass-filtered signals (dc-signals) are digitalized by means of two 12-bit analog-to-digital converters (19, 20). The digital values generated in this manner are the phase measurement values and can be called up by the host computer 8 via the DSP bus 21. After lowpass filtering, the output signals are shown in FIG. 3 as curves (E, F). The edge frequency of the lowpass filtering is so selected that, on the one hand, the frequency of the rectangularly-shaped signals is hardly still realizable at the output of the demodulators while, simultaneously, the desired measurement dynamic is, however, still ensured.

Coarse logarithmic data as to the amplitude of the input signal 3e can be called up by the host computer 8 via the level output of the FM-demodulator 16. For this purpose, a further lowpass filter 24 is connected downstream of the level output of the FM-demodulator 16 and an additional analog-to-digital converter 25 is connected to this lowpass filter 24.

The host computer calls up the generated phase measurement values and generates thereafter a control signal which is transmitted to the digital-to-analog converter 11 for controlling distance so that the distance between the probe tip and the object to be investigated or the distance between the probe tip and the surface of the memory device into which is to be written are adjusted to be constant and, as a consequence, the phase measurement value is likewise adjusted to a constant pregiven value.

The phase shift between the input signal 3e and the oscillator signal can be clearly determined only in the range of 0 to $\pi$ or $-\pi$ to 0 from each of the individual ones of the two dc-signals which are generated by lowpass filtering from the output signals (C, D) of the FM-demodulators (16, 22). The phase shift in the total range from 0 to $2\pi$ is unequivocal by comparing the two dc signals generated by lowpass filtering the output signals (C, D) of the FM-demodulators (16, 22).

Figure 4:
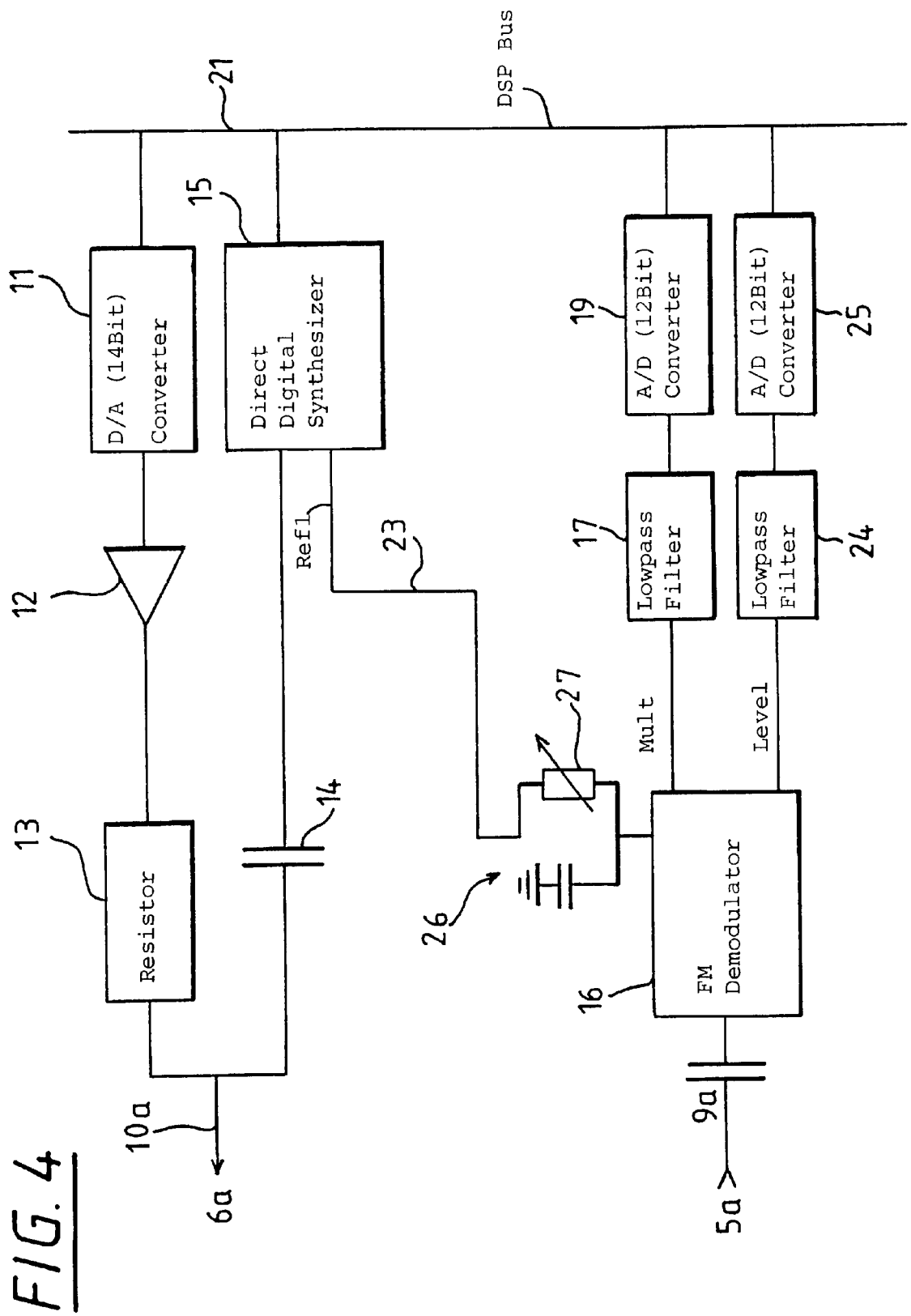

In the alternative embodiment of FIG. 4, only a single FM-demodulator 16 having downstream connected lowpass filters (17, 24) and analog-to-digital converters (19, 25) is provided. An RC unit 26 having a variable resistor 27 is provided in the connecting line 23 between the oscillator 15 and the FM-demodulator 16. With this variable resistor 27, the reference signal Ref1 can be shifted in phase compared to the actual excitation signal of the probe tip. By suitably trimming the resistor 27, the phase shift can be so adjusted in this embodiment that the value for the phase shift, which is derived from the output signal of the FM-demodulator 16, is unequivocal for practically all cases. Otherwise, this alternate embodiment corresponds to the embodiment of FIG. 2.

The embodiment of FIG. 4 is simplified compared to the embodiment of FIG. 2; however, the embodiment of FIG. 2 can be more universally utilized.

It is understood that the foregoing description is that of the preferred embodiments of the invention and that various changes and modifications may be made thereto without departing from the spirit and scope of the invention as defined in the appended claims.

What is claimed is:

1. A scanning system comprising:
   at least one deflectable probe unit;
   said probe unit including: a deflectable probe tip having a resonance frequency; and, an actuator operatively connected to said probe tip to impart oscillatory movement thereto;
   an oscillator for supplying an output excitation signal to said actuator for exciting said probe tip to oscillate at or near said resonance frequency;
   said probe unit further including a sensor detecting the oscillation of said probe tip and outputting a sensor signal indicative of said oscillation;
   a detection loop for determining the phase difference between said output excitation signal applied to said actuator and said sensor signal; and,
   said detection loop including a saturation amplifier for receiving and operating on said sensor signal.

2. The scanning system of claim 1, said sensor signal having zero crossovers; and, said saturation amplifier being configured to produce a rectangular output signal (A) from said sensor signal while maintaining the zero crossovers of said sensor signal.

3. The scanning system of claim 2, further comprising a multiplier connected downstream of said saturation amplifier; said oscillator supplying a reference signal (Ref1) to said multiplier; and, said multiplier multiplying said output signal (A) of said saturation amplifier by said reference signal (Ref1) of said oscillator.

4. The scanning system of claim 3, further comprising a lowpass filter connected downstream of said multiplier.

5. The scanning system of claim 4, further comprising a phase-shifting circuit for shifting said reference signal (Ref1) of said oscillator in phase.

6. The scanning system of claim 5, said phase-shifting circuit being an RC member having a variable resistor for shifting the phase of said reference signal (Ref1).

7. The scanning system of claim 4, said saturation amplifier being a first saturation amplifier and said reference signal being a first reference signal (Ref1) and said multiplier being a first multiplier and said lowpass filter being a first lowpass filter; and, said scanning system further comprising: a second saturation amplifier; said oscillator supplying a second reference signal (Ref2) to said second saturation amplifier shifted in phase by 90° relative to said first reference signal (Ref1); a second multiplier connected downstream of said second saturation amplifier; and, a second lowpass filter connected downstream of said second multiplier.

8. The scanning system of claim 3, further comprising a control arrangement for adjusting said deflectable probe tip to a pregiven fixed value of the phase difference between said output excitation signal of said oscillator and said sensor signal.

9. The scanning system of claim 1, wherein the operating frequency of said oscillator is variable.

10. The scanning system of claim 1, wherein said scanning system comprises a plurality of said deflectable probe units and a plurality of said detection loops for corresponding ones of said deflectable probe units and each of said detection loops including a saturation amplifier.

* * * * *